United States Patent [19]

Shibata et al.

[11] Patent Number: 4,525,563
[45] Date of Patent: Jun. 25, 1985

[54] OXYGEN PERMEABLE SOFT CONTACT LENS COMPOSITION

[75] Inventors: Takanori Shibata; Toshiharu Yoshikawa, both of Nagoya; Kenichi Isobe; Shoji Ichinohe, both of Annaka, all of Japan

[73] Assignees: Toyo Contact Lens Co., Nagoya; Shin-Etsu Chemical Co., Ltd., Tokyo, both of Japan

[21] Appl. No.: 589,251

[22] Filed: Mar. 13, 1984

[30] Foreign Application Priority Data

Apr. 6, 1983 [JP] Japan ................................. 58-60305

[51] Int. Cl.³ ............................................ C08F 30/08
[52] U.S. Cl. .................................... 526/279; 526/245; 526/264; 351/160 R; 351/160 H
[58] Field of Search .................... 526/279, 264, 245

[56] References Cited

U.S. PATENT DOCUMENTS 4,139,513  2/1979  Tanaka et al.
4,259,467  3/1981  Keogh et al. ........................ 526/279
4,260,725  4/1981  Keogh et al. ........................ 526/279
4,261,875  4/1981  LeBoeuf.
4,294,974 10/1981  LeBoeuf.

Primary Examiner—Melvyn I. Marquis
Attorney, Agent, or Firm—Armstrong, Nikaido, Marmelstein & Kubovcik

[57] ABSTRACT

A copolymer comprising,
(a) a hydrophilic siloxanylalkyl ester having a structure in which a siloxane part (1) having a terminal acryloyl or methacryloyl group and a siloxane part (2) having a terminal hydrophilic group are bonded through an alkylene chain with each other,
(b) a hydrophilic monomer, and
(c) a hydrophobic monomer
is suitable for use in the production of a soft contact lens having a high oxygen permeability and an excellent affinity for the eye tissue which can be worn continuously for a long period of time.

2 Claims, 3 Drawing Figures

OXYGEN PERMEABLE SOFT CONTACT LENS COMPOSITION

BACKGROUND OF THE INVENTION

The present invention relates to a copolymer suitable for use in the production of a water content soft contact lens having an excellent oxygen permeability.

Various kinds of soft contact lenses have hitherto been known, and their representative examples are, for instance, a water content soft contact lens made of a polymer comprising predominantly 2-hydroxyethyl methacrylate (hereinafter referred to as "2HEMA"), a soft contact lens having a high water content made of a copolymer comprising predominantly N-vinylpyrrolidone (hereinafter referred to as "NVP") and an amido group-containing monomer, a water non-content soft contact lens made of silicone rubber comprising predominantly polydimethylsiloxane, and the like.

Although these soft contanct lenses are superior in wearing sensation and affinity for the eye tissue, especially the corneal tissue, to the conventional water noncontent hard contact lenses made of a polymer of methyl methacrylate, they have the following defects.

For example, the water content soft contact lenses made of a polymer of 2HEMA cannot supply enough oxygen required in metabolism of corneal tissue from the atmosphere to the cornea through the lens materials, in other words, the oxygen permeability is bad. Consequently, wearing of such lenses for a long period of time causes metabolic trouble of the corneal tissue.

The soft contanct lenses made of a copolymer of NVP and an amido group-containing monomer having a water content of about 60% to 80% are superior in water content and oxygen permeability to the above soft contact lenses made of a polymer of 2HEMA. However, they have the defects such as (a) the strength of the contact lens materials is lower than that of low to medium-water content contact lens materials, (b) the contact lens is liable to be contaminated due to the accumulation of inorganic and/or organic substances contained in lacrimal fluid and (c) a stable absolute visual power is not obtained due to the difficulty of maintaining a constant lens contour because of evaporation of water upon wearing.

The silicone rubber contact lenses made of polydimethylsiloxane are excellent in oxygen permeability. In the contrary, the surface of them is so water-repellent that it should be modified into hydrophilic generally by corona discharge treatment. The thus treated lens surface, however, is liable to adhere contaminants such as proteins contained in lacrimal fluid. Consequently, these contact lenses make a trouble in the corneal tissue due to a strong sensation of foreign bodies, especially a burning sensation.

Furthermore, soft contanct lenses made of a copolymer of a siloxanylalkyl ester of acrylic acid or methacrylic acid and a hydrophilic monomer have been reported. The above siloxanylalkyl ester, however, is less in compatibility with a hydrophilic monomer due to its essentially strong hydrophobic property. Therefore, a copolymer sufficiently satisfied for contact lens materials has never been obtained.

Japanese Unexamined Patent Application No. 40324/1981 discloses a soft contact lens made of a copolymer of a specific siloxanylalkyl ester having hydroxyl group in its molecule and a hydrophilic monomer. Even by employing the above prior art, however, the essential hydrophobic property of the above siloxanylalkyl ester is not solved, and the thus obtained copolymer shows low strength. Therefore, it is difficult to make a more excellent soft contact lens being practically available.

It is an object of the present invention to provide a hydrophilic copolymer suitable for a soft contact lens having a high oxygen permeability and an excellent affinity for the eye tissue.

A further object of the present invention is to provide a copolymer suitable for an oxygen permeable soft contact lens which can be worn continuously for a long period of time.

These and other objects of the present invention will become apparent from the description hereinafter.

SUMMARY OF THE INVENTION

It has now been found that the above-mentioned objects can be attained by employing as one of the essential components of a copolymer suitable for oxygen permeable contact lenses a specific siloxanylalkyl ester having a hydrophilic group at the term of the molecule.

In accordance with the present invention, there can be provided a copolymer suitable for use in the production of an oxygen permeable soft contact lens, comprising (a) a hydrophilic siloxanylalkyl ester having a structure in which a siloxane part (1) having a terminal acryloyl or methacryloyl group and a siloxane part (2) having a terminal hydrophilic group are bonded through an alkylene chain with each other, (b) a hydrophilic monomer, and (c) a hydrophobic monomer.

DETAILED DESCRIPTION

Figure 1:
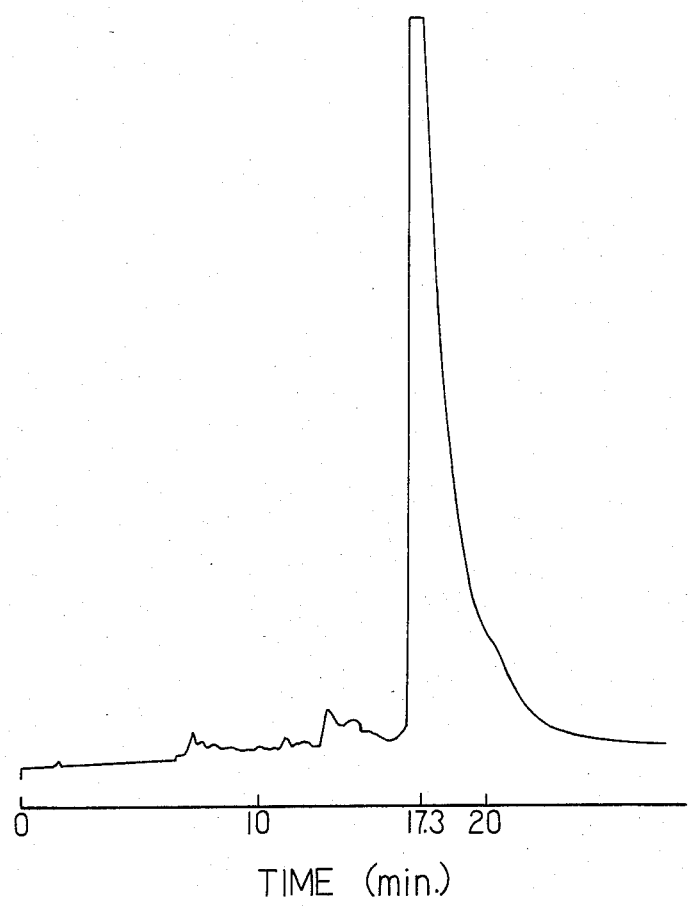
FIG. 1 is a gas chromatogram of Sil which is a novel hydrophilic siloxanylalkyl ester obtained in Reference Example 1.

The hydrophilic siloxanylalkyl ester as a component (a) in the present invention includes a compound having the formula (I):

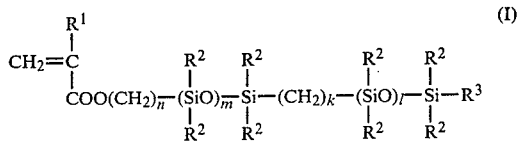

wherein $R^1$ is hydrogen atom or methyl group, $R^2$ is methyl group or $-OSi(CH_3)_3$, $R^3$ is a hydrophilic group selected from the group consisting of an oligo ether residue, a diol residue, an aminohydrin residue and an acid amido residue, n is an integer of 1 to 4, m and l are 0 or an integer of 1 to 2, and k is an integer of 2 to 4. In the hydrophilic siloxanylalkyl ester having the formula (I), the hydrophilic group of $R^3$ is bonded at the term of the molecule. Therefore, the compound (I) can sufficiently exhibit its hydrophilic property even if it is copolymerized with other monomer due to the high degree of freedom of the hydrophilic group of $R^3$. In the formula (I), k is an integer of 2 to 4, preferably 2. When k is larger than 4, the obtained copolymer is liable to be cut so that it becomes weak even though it remains soft. In the formula (I), l and m are 0 or an integer of 1 to 2, preferably 1. When l or m is larger than 2, the obtained copolymer becomes weak with the same reason as described in k. In the formula (I), n is an integer of 1 to 4, preferably 3, and when n is larger than 4, the obtained copolymer becomes weak with the same reason as described in k.

In the compound (I), the preferable hydrophilic substituent groups of $R^3$ are, for instance, an oligo ether residue represented by the formula:

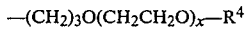

wherein x is 0 or an integer of 1 to 5, $R^4$ is hydrogen atom or an alkyl group having 1 to 4 carbon atoms; a diol residue represented by the formula:

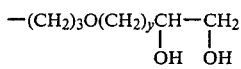

wherein y is an integer of 1 to 3; an aminohydrin residue represented by the formula:

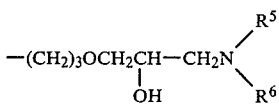

wherein $R^5$ and $R^6$ are the same or different, each is selected from hydrogen atom or an alkyl group having 1 to 4 carbon atoms; an aminohydrin residue represented by the formula:

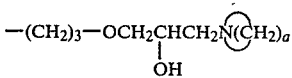

wherein a is an integer of 4 to 7; an acid amido residue represented by the formula:

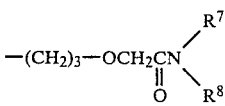

wherein $R^7$ and $R^8$ are the same or different, and each is selected from hydrogen atom or an alkyl group having 1 to 4 carbon atoms; an acid amido residue represented by the formula:

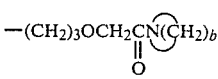

wherein b is an integer of 4 to 7, and the like. By employing as one of the essential components of a copolymer suitable for a contact lens the hydrophilic siloxanylalkyl ester of the formula (I) having the hydrophilic group selected from the above-mentioned hydrophilic group of $R^3$, the obtained copolymer becomes so compatible with other hydrophilic monomer that a soft contact lens having an excellent optical property and a high oxygen permeability which can be worn continuously for a long period of time is prepared.

By employing as one of the components of the above copolymer suitable for a soft contact lens a hydrophilic monomer, the desirable water content required in the soft contact lens can be maintained, and by employing a hydrophobic monomer, the strength of the soft contact lens can be preferably maintained. These are particularly excellent effects.

The hydrophilic siloxanylalkyl esters having the formula (I) are all novel, and they are prepared, for instance, by the following procedures:

[In case that a hydrophilic group is an oligo ether residue or an acid amido residue containing no hydroxyl group]

A hydrophilic siloxanylalkyl ester having an oligo ether residue represented by the formula:

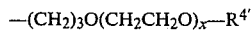

wherein x is as defined above, $R^{4'}$ is an alkyl group having 1 to 4 carbon atoms, an acid amido residue represented by the formula:

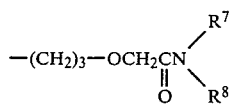

wherein $R^7$ and $R^8$ are as defined above, or an acid amido residue represented by the formula:

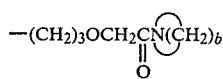

wherein b is as defined above can be prepared by reacting a siloxanylalkyl ester represented by the formula (II):

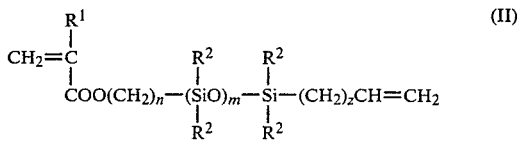

wherein $R^1$, $R^2$, m and n are as defined above, z is 0 or an integer of 1 to 2, with a siloxane having a terminal hydrophilic group represented by the formula (III):

wherein $R^2$ and l are as defined above, $R^{3'}$ is an oligo ether residue represented by the formula:

wherein x and $R^{4'}$ are as defined above, an acid amido residue represented by the formula:

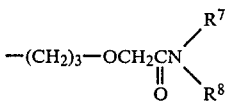

wherein $R^7$ and $R^8$ are as defined above, or an acid amido residue represented by the formula:

—(CH$_2$)$_3$OCH$_2$C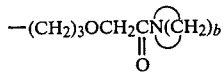
         ‖
         O wherein b is as defined above, in the presence of a catalyst, in the presence or absence of a solvent, at a temperature ranging from room temperature to 85° C. and for 2 to several ten hours.

[In case that a hydrophilic group is an oligo ether residue, a diol residue or an aminohydrin residue containing hydroxyl group]

The siloxanylalkyl ester represented by the formula (II) is reacted with a siloxane having a precursor being capable of forming a hydrophilic group at the term of the molecule represented by the formula (IV):

$$\begin{array}{c} R^2 \quad R^2 \\ | \quad\quad | \\ H-(SiO)_l-Si-R^{3''} \\ | \quad\quad | \\ R^2 \quad R^2 \end{array} \quad (IV)$$

wherein R$^2$ and l are as defined above, R$^{3''}$ is a group represented by the formula:

—(CH$_2$)$_3$O(CH$_2$CH$_2$O)$_x$—Si(CH$_3$)$_3$ wherein x is as defined above, a group represented by the formula:

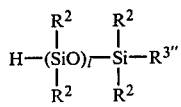

wherein y is as defined above, or a group represented by the formula:

—(CH$_2$)$_3$OCH$_2$CH——CH$_2$
                \ /
                 O in the same manner as mentioned above to give a siloxanylalkyl ester. Then a hydrophilic siloxanylalkyl ester having an oligo ether residue containing hydroxyl group represented by the formula:

—(CH$_2$)$_3$O(CH$_2$CH$_2$O)$_x$H wherein x is as defined above, can be prepared by subjecting the thus obtained siloxanylalkyl ester having the group represented by the formula:

—(CH$_2$)$_3$O(CH$_2$CH$_2$O)$_x$—Si(CH$_3$)$_3$ wherein x is as defined above, to the dealkoxirane reaction by treating with a conventional alcohol. Also, a hydrophilic siloxanylalkyl ester having a diol residue containing two hydroxyl groups represented by the formula:

—(CH$_2$)$_3$O(CH$_2$)$_y$CH—CH$_2$
              |      |
              OH     OH wherein y is as defined above, can be prepared from the thus obtained siloxanylalkyl ester having the group represented by the formula:

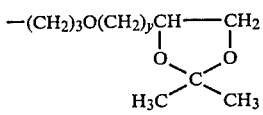

wherein y is as defined above, by a conventional acid treatment. A hydrophilic siloxanylalkyl ester having an aminohydrin residue represented by the formula:

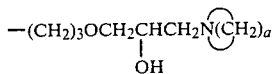

wherein a is as defined above, can be prepared from the thus obtained siloxanylalkyl ester having the group represented by the formula:

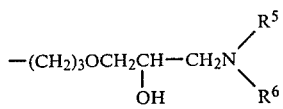

wherein R$^5$ and R$^6$ are as defined above, or an aminohydrin residue represented by the formula:

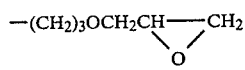

by treating with an amine represented by the formula:

R$^5$
    /
HN
    \
     R$^6$ wherein R$^5$ and R$^6$ are as defined above or an amine represented by the formula:

H

wherein a is as defined above.

Examples of the catalyst used in the above reactions are, for instance, platinum catalyst such as chloroplatinic acid, boron fluoride catalyst such as boron trifluoride, and the like. As a solvent used in the above reactions, although any solvent excepting a solvent reacting with the compound (II) or a solvent being a catalyst poison for the employed catalyst can be employed, preferable examples are, for instance, an nonpolar solvent such benzene, xylene, toluene, cyclohexane or n-hexane, and the like. In the above reactions, a polymerization-inhibitor such as hydroquinone, t-butylpyrocatechol or N,N'-dinaphthyl-p-phenylenediamine is usually employed.

The alcohol used in the above reactions includes, for instance, a conventional alcohol such as methanol, ethanol or propanol. The acid used in the above reactions, for instance, an organic acid having carbon atoms up to about ten such as formic acid, acetic acid, propionic acid, lactic acid or valeric acid, preferably an organic acid having 1 to 3 carbon atoms. A conventional inorganic acid such as phosphoric acid may be also employed.

The hydrophilic siloxanylalkyl ester used in the present invention may be employed alone or in admixture thereof.

Examples of the hydrophilic monomer used in the present invention are, for instance, an acrylate containing hydroxyl group such as ethylene glycol monoacrylate, diethylene glycol monoacrylate or triethylene glycol monoacrylate, a methacrylate containing hydroxyl group such as ethylene glycol monomethacrylate, diethylene glycol monomethacrylate, diethylene glycol monomethacrylate or triethylene glycol monomethacrylate, an N-vinyl lactam such as N-vinyl pyrrolidone, N-vinyl piperidone or N-vinyl caprolactam, a monomer containing an amido group such as acrylamide, a carboxylic acid having a polymerizability such as acrylic acid or methacrylic acid, and the like. The above monomers may be employed alone or in admixture thereof.

Examples of the hydrophobic monomer used in the present invention are, for instance, an alkyl ester having 1 to 18 carbon atoms of acrylic acid such as methyl acrylate, ethyl acrylate, propyl acrylate, butyl acrylate, hexyl acrylate, decyl acrylate, dodecyl acrylate or tetradecyl acrylate, an alkyl ester having 1 to 18 carbon atoms of methacrylic acid such as methyl methacrylate, ethyl methacrylate, propyl methacrylate, butyl methacrylate, hexyl methacrylate, decyl methacrylate, a vinyl ester of acrylic acid or methacrylic acid, an allylester of acrylic acid or methacrylic acid, an alkyl ester of itaconic acid or crotonic acid such as propyl itaconate or propyl crotonate, a vinyl ester of an aliphatic carboxylic acid such as vinyl acetate or vinyl propionate, styrene, and the like. The above hydrophobic monomers may be employed alone or in admixture thereof.

In case of selecting an alkyl ester of acrylic acid or methacrylic acid, or an alkyl ester of itaconic acid or crotonic acid as the hydrophobic monomer, the alkyl group may include, for instance, a fluorosubstituted alkyl group such as difluoroethyl, trifluoroethyl, trifluoropropyl, trifluorobutyl, trifluoropentyl, trifluorohexyl, pentafluorobutyl or pentafluoroheptyl.

The use of the above hydrophobic monomer is effective for controlling the water content and increasing the strength of the copolymer suitable for the water content soft contact lens so as to increase the durability of the contact lens. For the above purpose, the use of various esters such as alkyl ester, vinyl ester and allyl ester of acrylic acid or methacrylic acid as the above hydrophobic monomer is particularlly effective. Further, an alkyl ester having 4 to 14 carbon atoms of acrylic acid or methacrylic acid is preferably employed for providing a flexibility to the contact lens.

For the purpose of stabilizing the lens contour and dimension, there is usually employed a cross-linking monomer. Examples of the cross-linking monomer are, for instance, ethylene glycol diacrylate, diethylene glycol diacrylate, triethylene glycol diacrylate, ethylene glycol dimethacrylate, diethylene glycol dimethacrylate, triethylene glycol dimethacrylate, allyl methacrylate, trimethylol propane trimethacrylate, divinyl benzene, diallyl phthalate, and the like. The above cross-linking monomers may be employed alone or in admixture thereof.

The amount of the hydrophilic siloxanylalkyl ester having the formula (I) is selected from about 20 to about 80 parts by weight, preferably about 30 to about 70 parts by weight, based on 100 parts by weight of the total amount of the mixture of hydrophilic siloxanylalkyl ester, the hydrophilic monomer and the hydrophobic monomer. The amount of the hydrophilic monomer is selected from about 10 to about 60 parts by weight, preferably about 20 to about 40 parts by weight, based on 100 parts by weight of the total amount of the mixtrure of the hydrophilic siloxanylalkyl ester, the hydrophilic monomer and the hydrophobic monomer. The amount of the hydrophobic monomer is selectd from about 5 to about 60 parts by weight, preferably about 10 to about 50 parts by weight, based on 100 parts by weight of the total amount of the mixture of the hydrophilic siloxanylalkyl ester, the hydrophilic monomer and the hydrophobic monomer. The cross-linking monomer may be employed in an amount of about 0 to about 2.5 parts by weight based on 100 parts by weight of the total amount of the above mixture.

When the amount of the hydrophilic siloxanylalkyl ester is less than about 20 parts by weight, it is difficult to maintain the high oxygen permeability of the contact lens, and when the amount is more than about 80 parts by weight, the durability of the contact lens becomes low while the oxygen permeability becomes high. When the amount of the hydrophilic monomer is less than about 10 parts by weight, the contact lens shows a hard contact lens-like property, and when the amount is more than about 60 parts by weight, the water content of the contact lens so increases that the contour as the contact lens becomes unstable. When the amount of the hydrophobic monomer is less than about 5 parts by weight, there is made a trouble on the strength of the contact lens, and when the amount is more than about 60 parts by weight, the contact lens becomes relatively hard and shows a lower oxygen permeability. When the amount of the cross-linking monomer is more than about 2.5 parts by weight, the obtained contact lens becomes hard and lacks elasticity.

In the preparation of the soft contact lens of the present invention, there are employed free radical polymerization initiators used in the usual polymerization of unsaturated hydrocarbon compounds. Examples of the radical polymerization initiators are, for instance, benzoyl peroxide, azobisisobutyronitrile, azobisdimethylvaleronitrile and the like. The radical polymerization initiators may be employed alone or in admixture thereof. The preferable amount of the polymerization initiator is about 0.01 to about 2% by mole based on the amount of the reaction mixture.

The formation of the copolymer into contact lenses can be conducted by usual methods. One of the suitable methods is conducted by molding process. The mold used has a concavo-convex inner surface being suitable for the desired contact lens shape.

The polymerization is carried out by pouring a monomer mixture and a slight amount of a polymerization initiator into the above concavo mold by a usual technique, and then putting a convex mold over the concavo mold and interposing with a cramp at about 50° to 200° C. for 5 to several ten hours. After completion of the polymerization and cooling, a copolymer being formed in a shape of contact lens is obtained by removing the concavo mold and convex mold. The thus obtained copolymer is immersed in an aqueous solution such as physiological saline solution to give an oxygen permeable soft contact lens of the present invention.

The thus obtained oxygen permeable soft contact lens of the present invention has the following excellent properties:

(a) An oxygen permeability at a normal temperature and a normal pressure is $1.5 \times 10^{-10}$ cc.cm/cm$^2$.sec.mmHg or more, which is the same or more than that of a contact lens having a relatively high water content of about 50% or more.

(b) A relatively low water content of about 35% or less of the contact lens of the present invention solves the defect that the eye power is unstable due to the insufficient maintenance of the lens contour observed in the conventional contact lens having a high water content.

(c) The siloxanylalkyl ester having the formula (I) has excellent compatibility with the hydrophilic monomer and the hydrophobic monomer because of the suitable hydrophilicity of the siloxanylalkyl ester (I). Accordingly, the contact lens obtained by copolymerization is homogeneous, opticaly clear and good in visible ray transparency.

(d) The contact lens of the present invention shows an improved durability and no particular decrease in the strength on swelling with water.

The present invention is more specifically described and explained by means of the following Reference Examples and Examples in which all parts are by weight unless otherwise noted. It is to be understood that the present invention is not limited to the Examples, and various changes and modifications may be made in the invention without departing from the spirit and scope thereof.

REFERENCE EXAMPLE 1

[Synthesis of 1-(γ-methacryloyloxypropyl-α,α,γ,γ-tetramethyldisiloxy)-2-(γ'-methoxyethoxyethoxypropyl-α',α',γ',γ'-tetramethyldisiloxy)ethane]

(A) (Synthesis of 1-methoxyethoxyethoxypropyl-1,1,3,3-tetramethyldisiloxane)

To a four-necked flask of 500 ml equipped with a stirrer, a cooling tube, a thermometer and a dropping funnel were added 268 g of 1,1,3,3-tetramethyldisiloxane (made by Shin-Etsu Chemical Co., Ltd.) and 0.01 g of chloroplatinic acid, and 80 g of diethylene glycol allylmethyl ether was further added dropwise to the flask with stirring in two hours at 50° C. After the reaction for three hours under the same condition as above, the reaction mixture was distilled under reduced pressure. The distillate obtained at 109° to 110° C./1.5 mmHg was collected to give 66.4 g (yield: 45%) of 1-methoxyethoxyethoxypropyl-1,1,3,3-tetramethyldisiloxane (hereinafter referred to as "3ESi").

(B) (Synthesis of 1,3-bis(3-chloropropyl)-1,1,3,3-tetramethyldisiloxane)

To a triangular flask of 2 l containing 1200 ml of water was added dropwise 342 g of 3-chloropropylchlorodimethylsilane (hereinafter referred to as "CPCDMSi") in an hour while stirring with a magnetic stirrer at a room temperature. After completion of the addition, the reaction mixture was neutralized with sodium carbonate and then extracted three times with each 500 ml of n-hexane. After drying the n-hexane layer with anhydrous magnesium sulfate, n-hexane was removed under reduced pressure. The obtained residue was distilled under reduced pressure, and then the distillate obtained at 103° C./1.5 mmHg was collected to give 255 g (Yield 89%) of 1,3-bis(3-chloropropyl)-1,1,3,3-tetramethyldisiloxane (hereinafter referred to as "BCPSi").

(C) (Synthesis of 1,3-bismethacryloyloxypropyl-1,1,3,3-tetramethyldisiloxane)

To a redish brown three-necked flask of 2 l equipped with a stirrer, a cooling tube and a thermometer were added 172.2 g of BCPSi obtained in the above (B), 206.4 g of methacrylic acid, 242.4 g of triethylamine, 540 g of dimethylformamide and 6 g of hydroquinone, and the reaction mixture was reacted with stirring under the condition of refluxing (about 122° C.) for 10 hours. After completion of the reaction, triethylamine hydrochloride was filtered off by suction filter. The obtained hydrochloride was washed several times with each 100 ml of n-hexane, and the washings were added to the filtrate.

To the filtrate were further added 700 ml of water and 50 g of sodium carbonate, and then the mixture was extracted three times with each 500 ml of n-hexane. After drying the n-hexane layer with anhydrous magnesium sulfate, the substances having a low boiling point such as n-hexane were completely distilled away from the n-hexane layer under a pressure of 0.2 mmHg, at 60° C. for 30 minutes, to give 206 g (yield: 89%) of 1,3-bis(methacryloyloxypropyl)-1,1,3,3-tetramethyldisiloxane (hereinafter referred to as "BMPSi").

(D) (Synthesis of 1-methacryloyloxypropyl-3-vinyl-1,1,3,3-tetramethyldisiloxane)

To a triangular flask of 500 ml were added 74.4 g of 1,3-divinyl-1,1,3,3-tetramethyldisiloxane (hereinafter referred to as "DVSi" made by Shin-Etsu Chemical Co., Ltd.), 154.4 g of BMPSi obtained in the above (C) and 4 g of conc-sulfuric acid, and the reaction mixture was reacted with stirring at a room temperature for 24 hours. After reaching equilibrium, which was checked by gas chromatography (hereinafter referred to as "GC"), 800 ml of n-hexane was added to the reaction mixture. The reaction mixture was washed successively with 500 ml of 10% sodium carbonte aqueous solution and 500 ml of water, and then dried with anhydrous magnesium carbonate. After removing n-hexane under reduced pressure, the residue was distilled under reduced pressure, and then the distillate obtained at 80° C./0 15 mmHg was collected to give 48.1 g (yield: 42%) of 1-methacryloyloxypropyl-3-vinyl-1,1,3,3-tetramethyldisiloxane (hereinafter referred to as "MPVSi").

The desired compound was synthesized according to the following method by employing 3ESi synthesized in the above (A) and MPVSi synthesized in the above (D).

To a redish brown four-necked flask equipped with a stirrer, a cooling tube, a dropping-funnel and a thermometer were added 42.9 g of MPVSi, 0.2 g of hydroquinone, 60 g of cyclohexane and 0.01 g of chloroplatinic acid, and further added dropwise 44.1 g of 3ESi in an hour with stirring at 50° C. After the reaction for 3 hours under the same condition as above, 500 ml of n-hexane was added to the reaction mixture. The obtained reaction mixture was successively washed three times with each 300 ml of 10% sodium carbonate aqueous solution and with 300 ml of water, and then dried on anhydrous magnesium sulfate. After removing n-hexane under reduced pressure and then completely removing substances having a low boiling point under 0.5 mmHg, at 60° C. for 30 minutes, 82.8 g (yield: 95.2%) of the product was obtained.

The obtained product was colorless transparent liquid being slightly viscous and showed a purity analyzed by GC of 95.2%. The resulting product was proved to be 1-(γ-methacryloyloxypropyl-α,α,γ,γ-tetramethyldisiloxy)-2-(γ'-methoxyethoxyethoxypropyl-α',α',γ',γ'-tetramethyldisiloxy)ethane (hereinafter referred to as "Si1") by analyzing with Infrared Absorption (hereinafter referred to as "IR") spectrum analysis, Nuclear Magnetic Resonance (hereinafter referred to as "1H-NMR") spectrum analysis and Elementary analysis.

The results of GC analysis, IR spectrum analysis, 1H-NMR spectrum analysis and Elementary analysis are shown as follows:

GC analysis:

The result is shown in FIG. 1.

GC analysis was carried out by using Shimadzu GC-8A type gas chromatographic analysis apparatus, Shimadzu C-R-1A type chromato pack, made by Shimadzu Corporation. The conditions of the GC analysis were: (1) column length: 2 m, (2) packing: 3% Silicone OV-17 made by Gas Chro Kogyo Co., Ltd, (3) column temperature: 80° to 280° C. (temperature increasing rate: 20° C./minute), (4) injection temperature: 360° C., (5) detecting method: FID (6) carrier gas: He, and (7) flow volume: 2 kg/cm². The GC purity was measured by caliculating the peak area.

Figure 2:
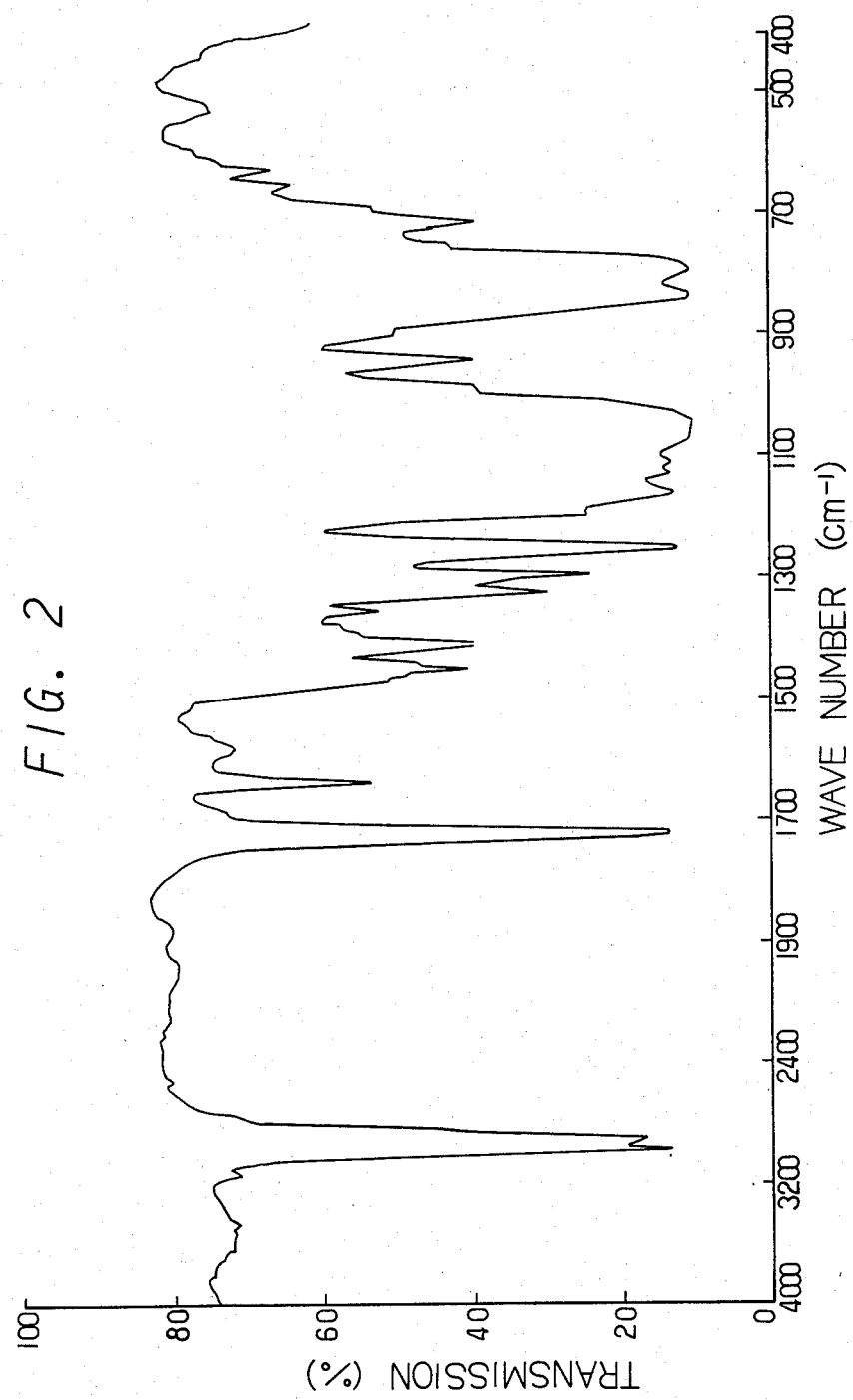
FIG. 2 is an IR spectrum of Sil and FIG. 3 is a $^1$H-NMR spectrum of Sil.

IR spectrum analysis:

The result is shown in FIG. 2.

IR spectrum analysis was carried out by employing Nippon Bunko A-201 infrared spectrophotometer made by Nippon Bunko Kogyo Co., Ltd.

1H-NMR spectrum analysis (δ value, ppm): 6.05 (m, 1H), 5.35 (m, 1H), 4.05 (t, 2H), 3.5 (m, 8H), 3.3 (s and m, 5H), 1.95 (m, 3H), 1.3 to 1.9 (m, 4H), 0.5 (m, 8H), 0.08 (s, 12H), 0.66 (s, 12H)

The above "s", "d", "t" and "m" indicate, respectively, a single peak, a double peak, a triple peak and multiple peak.

Figure 3:
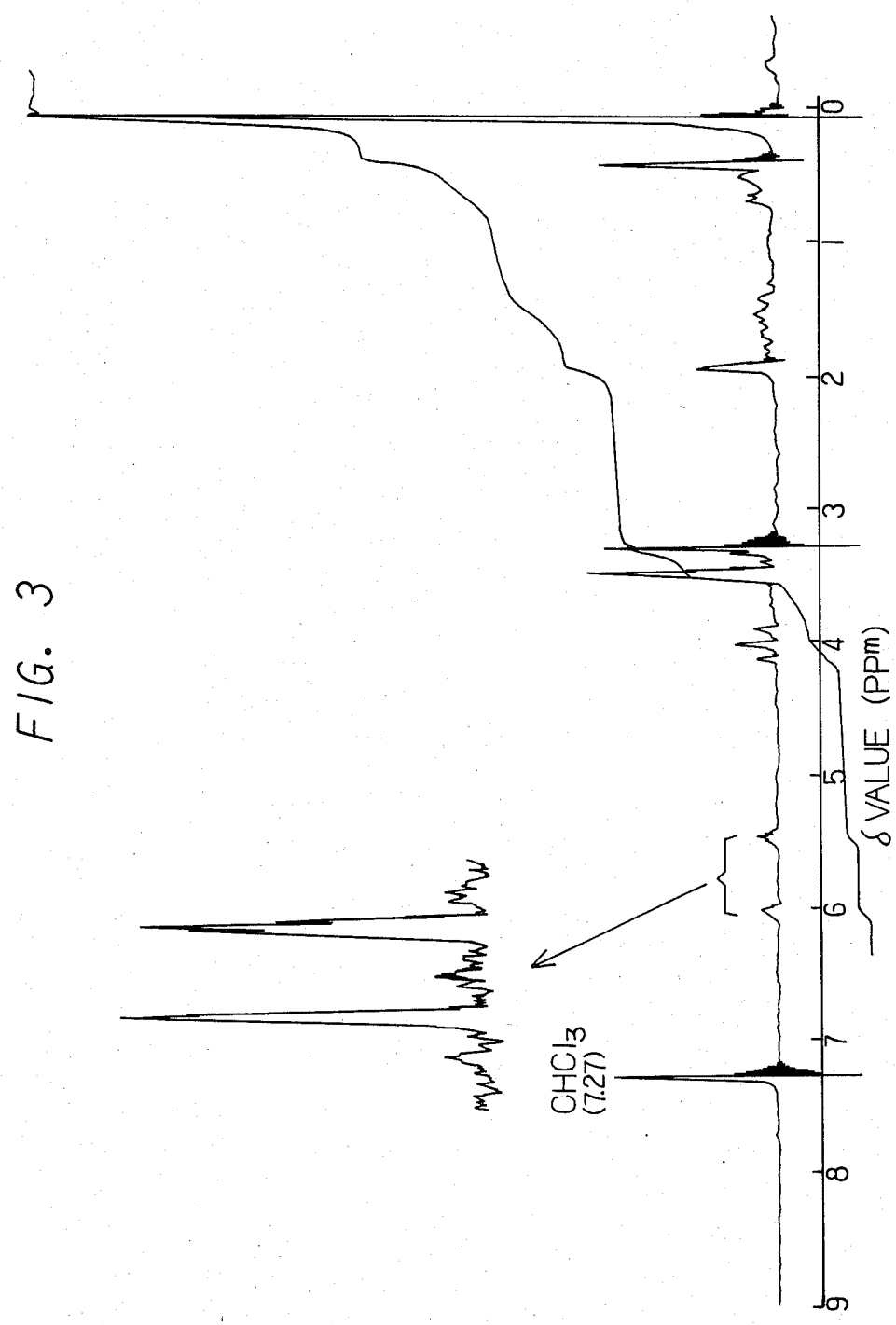

1H-NMR spectrum is shown in FIG. 3.

1H-NMR spectrum analysis was carried out by employing Nihon DENSHI JNM-PMX60 nuclear magnetic resonance spectrophotometer made by NIHON DENSHI KABUSHIKI KAISHA under a condition of sweep width: 10 ppm, sweep time: 250 seconds, and a solvent: CCl₄/CHCl₃.

Elementary analysis for $C_{25}H_{52}O_7Si_4$: Calcd. (%): C 52.1 H 9.0. Found (%): C 52.9 H 9.3.

The elementary analysis was carried out by employing Shimadzu A-1 type CHN analyser made by Shimadzu Corporation.

REFERENCE EXAMPLE 2

[Synthesis of 1-(γ-methacryloyloxymethyl-α,α,γ,γ-tetramethyldisiloxy)-2-(γ'-methoxyethoxyethoxypropyl-α',α',γ',γ'-tetramethyldisiloxy)ethane]

The procedures of Reference Example 1(C) were repeated except that 138.6 g of 1,3-bis(chloromethyl)-1,1,3,3-tetramethyldisiloxane (hereinafter referred to as "BCMSi" made by Shin-Etsu Chemical Co., Ltd.) instead of 172.7 g of BCPSi was employed to give 1,3-bis-(methacryloyloxymethyl)-1,1,3,3-tetramethyldisiloxane (hereinafter referred to as "BMMSi"). The thus obtained BMMSi was distilled under reduced pressure, and then 169.2 g (yield: 94%) of the distillate was obtained at 92° to 93° C./0.1 mmHg. Further, 165 g of BMMSi and 93 g of DVSi were reacted by using 5 g of conc-sulfuric acid in the same manner as in Reference Example 1(D) to give 1-methacryloyloxymethyl-3-vinyl-1,1,3,3-tetramethyldisiloxane (hereinafter referred to as "MMVSi") which was further distilled under reduced pressure to give 118.5 g (yield: 46%) of the distillate at 90° to 91° C./2 mmHg.

The thus obtained 38.7 g of MMVSi was reacted with 44.1 g of 3ESi obtained in Reference Example 1(A) in the presence of 0.2 g of hydroquinone, 80 g of cyclohexane and 0.01 g of chloroplatinic acid in the same manner as in Reference Example 1 to give 79.7 g (yield: 96.3%) of the synthesized product.

The resulting product was a colorless transparent liquid being slightly viscous. The GC purity measured in the same manner as in Reference Example 1 was 98.0%. The resulting product was proved to be 1-(γ-methacryloyloxymethyl-α,α,γ,γ-tetramethyldisiloxy)-2-(γ-methoxyethoxyethoxypropyl-α',α',γ',γ'-tetramethyldisiloxy)ethane hereinafter referred to as "Si2") by the identification analysis conducted in the same manner as in Reference Example 1.

REFERENCE EXAMPLE 3

[Synthesis of 1-(γ-methacryloyloxypropyl-α,α,γ,γ-tetramethyldisiloxy)-2-(γ'-methoxyethoxyethoxyethoxypropyl-α',α',γ',γ'-tetramethyldisiloxy)ethane]

The procedures of Reference Example 1(A) were repeated except that 61.2 g of triethylene glycol allymethyl ether instead of 80 g of diethylene glycol allylmethyl ether was employed to give 1-methoxyethoxyethoxyethoxypropyl-1,1,3,3-tetramethylsiloxane (hereinafter referred to as "4ESi") which was further distilled under reduced pressure to give 37.7 g (yield: 37.2%) of the distillate at 115° C./0.3 mmHg. The thus obtained 33.8 g of 4ESi was reacted with 28.6 g of MPVSi obtained in Reference Example 1(D) in the presence of 0.2 g of hydroquinone, 60 g of cyclohexane and 0.01 g of chloroplatinic acid in the same manner as in Reference Example 1 to give 62 g (yield: 99%) of the synthesized product.

The thus obtained product was colorless transparent liquid being slightly viscous. The GC purity measured in the same manner as in Reference Example 1 was 93.2%. The obtained product was proved to be 1-(γ-methacryloyloxypropyl)α,α,γ,γ-tetramethyldisiloxy)-2-(γ'-methoxyethoxyethoxyethoxypropyl-α',α',γ',γ'-tetramethyldisiloxy)ethane (hereinafer referred to as "Si3") by the identification analysis conducted in the same manner as in Reference Example 1.

REFERENCE EXAMPLE 4

[Synthesis of 1-(γ-methacryloyloxymethyl-α,α,γ,γ-tetramethyldisoloxy)-2-(γ'-methoxyethoxyethoxyethoxypropyl-α',α',γ',γ'-tetramethyldisiloxy)ethane]

There were reacted 12.9 g of MMVSi prepared in Reference Example 2 and 16.9 g of 4ESi prepared in Reference Example 3 in the presence of 0.1 g of hydroquinone, 40 g of cyclohexane and 0.01 g of chloroplatinic acid in the same manner as in Reference Example 1 to give 27.8 g (yield: 93.3%) of the synthesized product.

The obtained product was a colorless transparent liquid being slightly various. The product was proved to be 1-(γ-methacryloyloxymethyl-α,α,γ,γ-tetramethyldisiloxy)-2-(γ'-methoxyethoxyethoxyethoxypropyl-α',α',γ',γ'-tetramethyldisiloxy)ethane (hereinafter referred to as "Si4") by the identification analysis conducted in the same manner as in Reference Example 1.

REFERENCE EXAMPLE 5

[Synthesis of
1-(γ-methacryloyloxypropyl-α,α,γ,γ-tetramethyldisiloxy)-2-(γ'-N,N-dimethylcarbamoylmethyloxypropyl-α',α',γ',γ'-tetramethyldisiloxy)ethane]

(E) (Synthesis of
1-N,N-dimethylcarbamoylmethyloxypropyl-1,1,3,3-tetramethyldisiloxane)

To a four-necked flask equipped with a stirrer, a cooling tube, a thermometer and a dropping funnel were added 117.3 g of 1,1,3,3-tetramethyldisiloxane made by Shin-Etsu Chemical Co., Ltd. and 0.01 g of chloroplatinic acid, and further 50 g of allyloxy-N,N-dimethylacetamide was added dropwise in an hour with stirring at 50° C. The reaction mixture was reacted for 3 hours, and then distilled under reduced pressure. The distillate obtained at 123° to 124° C./2 mmHg was collected to give 37.8 g (yield: 48%) of 1-N,N-dimethylcarbamoylmethyloxypropyl-1,1,3,3-tetramethyldisiloxane (hereinafter referred to as "CNSi").

The desired compound was synthesized according to the following method by employing the above CNSi and MPVSi obtained in Reference Example 1(D).

To a redish brown four-necked flask of 300 ml equipped with a stirrer, a cooling tube, a thermometer and a dropping funnel were added 14.3 g of MPVSi, 0.2 g of hydroquinone, 60 g of cyclohexane and 0.01 g of chloroplatinic acid. After adding dropwise 13.85 g of CNSi with stirring in an hour at 50° C., the reaction mixture was reacted for 3 hours. To the reaction mixture was added 500 ml of n-hexane, and then the reaction mixture was successively washed three times with each 300 ml of 10% anhydrous sodium carbonate aqueous solution and with 300 ml of water. After drying on anhydrous magnesium sulfate, n-hexane was removed under reduced pressure. The substances having a low boiling point were completely removed at 0.5 mmHg and 60° C. in 30 minutes from the reaction mixture to give 27.9 g (yield: 99.1%) of the synthesized product.

The thus obtained product was a light yellowish and transparent liquid being slightly viscous. The GC purity measured in the same manner as in Reference Example 1 was 89.2%. The product was proved to be 1-(γ-methacryloyloxypropyl-α,α,γ,γ-tetramethyldisiloxyl)-2-(γ'-N,N-dimethylcarbamoylmethyloxypropyl-α',α',γ',γ'-tetramethyldisiloxy)ethane (hereinafter referred to as "Si5") by the identification analysis conducted in the same manner as in Reference Example 1.

REFERENCE EXAMPLE 6

[Synthesis of
1-(γ-methacryloyloxymethyl-α,α,γ,γ-tetramethyldisiloxy)-2-(γ'-N,N-dimethylcarbamoylmethyloxypropyl-α',α',γ',γ'-tetramethyldisiloxy)ethane]

There were reacted 13.85 g of CNSi and 12.9 g of MMVSi obtained in Reference Example 2 in the presence of 0.1 g of hydroquinone, 40 g of cyclohexane and 0.01 g of chloroplatinic acid in the same manner as in Reference Example 5 to give 24.4 g (yield: 91.2%) of the synthesized product.

The thus obtained product was a light yellowish and transparent liquid being slightly viscous. The GC purity measured in the same manner as in Reference Example 1 was 94.3%. The product was proved to be 1-(γ-methacryloyloxymethyl-α,α,γ,γ-tetramethyldisiloxy)-2-(γ'-N,N-dimethylcarbamoylmethyloxypropyl-α',α',γ',γ'-tetramethyldisiloxy)ethane (hereinafter referred to as "Si6") by the identification analysis conducted in the same manner as in Reference Example 1.

REFERENCE EXAMPLE 7

[Synthesis of
1-(γ-methacryloyloxypropyl-α,α,γ,γ-tetramethyldisiloxy)-2-(γ'-2-hydroxy-3-diethylaminopropoxypropyl-α',α',γ',γ'-tetramethyldisiloxy)ethane]

The reaction product prepared by reacting 171 g of allylglycidyl ether made by Yoneyama Yakuhin Kogyo Co., Ltd. and 201 g of 1,1,3,3-tetramethyldisiloxane was distilled under reduced pressure, and 182.3 g (yield: 49%) of the distillate obtained at 115° C./5 mmHg was collected. There was reacted 27.4 g of the thus obtained product with 28.6 g of MPVSi obtained in Reference Example 1(D) in the presence of 0.2 g of hydroquinone, 60 g of cyclohexane and 0.01 g of chloroplatinic acid in the same manner as in Reference Example 1 to give 52.3 g (yield: 93.4%) of the synthesized product. To 28.6 g of the resulting product were added 100 g of diethylamine and 1.2 g of boron trifluoride ethyl etherate being 46% ethyl ether solution made by WAKO Pure Chemical Industry Co., Ltd., and the reaction mixture was reacted with stirring at a room temperature for 48 hours. After the addition of 300 ml of benzene, the reaction mixture was washed twice with each 300 ml of 1% sodium carbonate aqueous solution and dried on anhydrous magnesium sulfate. After removing the solvent, 23.1 g (yield: 80.1%) of the synthesized product was obtained.

The thus obtained product was a light yellowish and transparent liquid being slightly viscous. The GC purity measured in the same manner as in Reference Example 1 was 89.1%. The Product was proved to be 1-(γ-methacryloyloxypropyl-α,α,γ,γ-tetramethyldisiloxy)-2-(γ'-2-hydroxy-3-diethylaminopropoxypropyl-α',α',γ',γ'-tetramethyldisiloxy)ethane (hereinafter referred to as "Si7") by the identification anlysis conducted in the same manner as in Reference Example 1.

REFERENCE EXAMPLE 8

[Synthesis of
1-(γ-methacryloyloxymethyl-α,α,γ,γ-tetramethyldisiloxy)-2-(γ'-2-hydroxy-3-diethylaminopropoxypropyl-α',α',γ',γ'-tetramethyldisiloxy)ethane]

There was reacted 49.6 g of 1-glycidyloxypropyl-1,1,3,3-tetramethyldisiloxane prepared by reacting allylglycidyl ether and 1,1,3,3-tetramethyldisiloxane with 56.1 g of MMVSi obtained in Reference Example 2 in the presence of 0.2 g of hydroquinone, 60 g of cyclohexane and 0.01 g of chloroplatinic acid in the same manner as in Reference Example 1 to give 97.5 g (yield: 96.3%) of the synthesized product. To 25.3 g of the thus obtained product were added 100 g of diethylamine and 1.2 g of boron trifluoride ethyl etherate, and the reaction mixture was treated in the same manner as in Reference Example 7 to give 15.6 g (yield: 53.9%) of the synthesized product.

The resulting product was a light yellowish and transparent liquid being slightly viscous. The GC purity measured in the same manner as in Reference Example 1 was 67.7%. By the identification analysis conducted in the same manner as in Reference Example 1, the resulting product was proved to be 1-(γ-methacryloyloxymethyl-α,α,γ,γ-tetramethyldisiloxy)-2-(γ'-2-hydroxy-3-diethylaminopropoxypropyl-α',α',γ',γ'-tetramethyldisiloxy)ethane (hereinafter referred to as "Si8").

REFERENCE EXAMPLE 9

[Synthesis of 1-(γ-methacryloyloxymethyl-α,α,γ,γ-tetramethyldisiloxy)-2-(γ'-2,3-dihydroxypropoxypropyl-α',α',γ',γ'-tetramethyldisiloxy)ethane]

There were reacted 223.6 g of ketallallyl ether prepared by reacting allylglycidyl ether and acetone in the presence of an acid catalyst such as boron trifluoride with 174.2 g of 1,1,3,3-tetramethyldisiloxane in the presence of 0.02 g of chloroplatinic acid in the same manner as in Reference Example 1. The reaction mixture was distilled under reduced pressure, and then the distillate obtained at 128° C./1.5 mmHg was collected to give 199.8 g (yield: 50.2%) of the synthesized product. The thus obtained 61.2 g of the product was reacted with 51.6 g of MMVSi in the presence of 0.02 g of chloroplatinic acid and 0.1 g of hydroquinone in the same manner as in Reference Example 1 to give 107.4 g (yield: 95.2%) of the product. To 5 g of the resulting product was further added 20 g of acetic acid and 1 g of water, and the reaction mixture was reacted with stirring at a temperature in the range of 30° C. to 40° C. for 36 hours. After the addition of 200 ml of n-hexane and the neutralization with anhydrous sodium carbonate, the reaction mixture was washed three times with each 200 ml of water and dried on anhydrous magnesium sulfate. After removing the solvent under reduced pressure, 3.8 g (yield: 81.8%) of the synthesized product. The resulting product was a colorless and transparent liquid being slightly viscous and showed the GC purity measured in the same manner as in Reference Example 1 of 67.4%. The product was proved to be 1-(γ-methacryloyloxymethyl-α,α,γ,γ-tetramethyldisiloxy)-2-(γ'-2,3-dihydroxypropoxypropyl-α',α',γ',γ'-tetramethyldisiloxy)ethane (hereinafter referred to as "Si9") by the identification analysis conducted in the same manner as in Reference Example 1.

EXAMPLE 1

A concavo mold and a convex mold corresponding to a shape of contact lens to be formed were prepared from polypropylene by mechanical processes such as cutting and polishing.

There were admixed Si1 being a hydrophilic siloxanylalkyl ester, dodecyl methacrylate being a hydrophobic monomer, NVP and 2HEMA being hydrophilic monomers, allylmethacrylate being a cross-linking monomer and 2,2'-azobis(2,4-dimethylvaleronitrile) being a polymerization initiator in the amounts shown in Table 1. The resulting admixture was gradually poured into the above concavo mold, and then the above convex mold was put on the concavo mold. The two molds were carefully interposed with a cramp for fixsation so as to prevent bubble forming, and then heated at 50° C. for 3 hours by a air circulating dryer. The polymerization was stepwise carried out by increasing a temperature in a proportion of 10° C./90 minutes for 15 hours. After cooling and taking off the cramp, the molds were immersed in distilled water and heated up to boiling to separate the concavo mold and the convex mold, and then they were boiling for one hour as solution were. The thus formed contact lenses were taken out and immersed in 0.9% physiological saline for sufficiently hydrating and swelling the lens to give the desired soft contact lens.

The thus obtained soft contact lens was colorless transparent, so stable in lens contour that it had a sufficient restoring force against bending, and excellent in water wettability of the lens surface.

With respect to specimen being a copolymer in the form of film having a thickness of 0.4 mm prepared by employing the same components as those of Example 1 and polymerizing in the same manner as in Example 1, water content, oxygen permeability, contact angle, penetrating strength and visible ray percent transmission were measured by the following methods. The results are shown in Table 1.

[Water content]

The specimen was boiled in distilled water to make it equilibrium with water, and then the wet weight of the specimen was measured. The specimen was then dried in a dryer at 50° C. for 2 days, and then the dry weight of the specimen was measured. The percent water content was caliculated on the basis of the following formula.

$$\text{Water content (\%)} = \frac{\text{(Wet weight)} - \text{(Dry weight)}}{\text{Wet weight}} \times 100$$

[Oxygen permeability]

Oxygen permeability (cc.cm/cm$^2$.sec.mmHg) was measured at 35° C. by a film-oxygen gas permeater of Seikaken type made by Rikaseiki Kogyo Kabushiki Kaisha with respect to the above specimen.

[Needle Penetration strength]

The peripheral region of the specimen was fixed on a cylindrical stand of a penetration strength tester. A round head of a pressure needle having a diameter of 1 mm was put on the center of the specimen, and the pressure was excerted to the specimen by weighing from a tail of the needle. A weight value per $\sqrt{\text{film}}$ thickness (mm) was converted from a weight value (g) obtained at the time when the specimen was extended and broken. This value was used here as penetration strength.

[Contact angle]

Contact angle was measured by bubble method using a goniometer type contact angle measuring aparatus made by Erma Kogaku Kabushiki Kaisha, and the mean value was obtained from four measurments.

[Visible ray percent transmission]

Visible ray percent transmission in the visible range of 380 nm to 780 nm was measured by Shimadzu UV-240 Recording Spectrophotometer made by Shimadzu Corporation.

EXAMPLES 2 TO 30

The procedures of Example 1 were repeated except that the kinds and amounts of components were changed as shown in Table 1 to give the respective copolymer in a form of film having a thickness of 0.4 mm. The physical properties were measured in the same manner as in Example 1. The results are shown in Table 1.

TABLE 1

| Ex. No. | 1 | 2 | 3 | 4 | 5 |
|---|---|---|---|---|---|
| Components (part) | | | | | |
| Hydrophilic siloxanylalkyl ester | Si1(30) | Si1(50) | Si1(70) | Si2(30) | Si2(50) |
| Hydrophobic monomer | | | | | |
| Dodecyl methacrylate | 40 | 30 | 10 | 40 | 30 |
| Methyl methacrylate | — | — | — | — | — |
| Butyl methacrylate | — | — | — | — | — |
| Hydrophilic monomer | | | | | |
| NVP | 15 | 10 | 10 | 15 | 10 |
| 2HEMA | 15 | 10 | 10 | 15 | 10 |
| Dimethylacrylamide | — | — | — | — | — |
| Cross-linking monomer | | | | | |
| Allyl methacrylate | 0.5 | 0.5 | 0.5 | 0.5 | 0.5 |
| 2,2′-Azobis-(2,4-dimethylvaleronitrile) | 0.1 | 0.1 | 0.1 | 0.1 | 0.1 |
| Physical properties | | | | | |
| Water content (%) | 16.3 | 10.2 | 10.4 | 15.4 | 9.02 |
| Oxygen permeability ($\times 10^{-10}$ cc · cm/cm$^2$ · sec · mmHg) | 4.3 | 3.3 | 3.9 | 3.6 | 3.5 |
| Needle penetration strength (g/$\sqrt{mm}$) | 596 | 291 | 262 | 769 | 579 |
| Contact angle (°) | 24.7 | 28.1 | 30.0 | 28.5 | 32.5 |
| Visible ray percent transmission (%) | >90 | >90 | >90 | >90 | >90 |

| Ex. No. | 6 | 7 | 8 | 9 | 10 |
|---|---|---|---|---|---|
| Components (part) | | | | | |
| Hydrophilic siloxanylalkyl ester | Si2(70) | Si3(30) | Si3(50) | Si3(20) | Si3(60) |
| Hydrophobic monomer | | | | | |
| Dodecyl methacrylate | 10 | 40 | 30 | 13 | — |
| Methyacrylate | — | — | — | — | — |
| Butyl methacrylate | — | — | — | 40 | 20 |
| Hydrophilic monomer | | | | | |
| NVP | 10 | 15 | 10 | 20 | 10 |
| 2HEMA | 10 | 15 | 10 | 20 | 10 |
| Dimethylacrylamide | — | — | — | — | — |
| Cross-linking monomer | | | | | |
| Allyl methacrylate | 0.5 | 0.5 | 0.5 | 0.5 | 0.5 |
| 2,2′-Azobis-(2,4-dimethylvaleronitrile) | 0.1 | 0.05 | 0.05 | 0.05 | 0.05 |
| Physical properties | | | | | |
| Water content (%) | 11.4 | 12.9 | 7.8 | 23.8 | 12.5 |
| Oxygen permeability ($\times 10^{-10}$ c · cm/cm$^2$ · sec · mmHg) | 4.4 | 3.6 | 4.4 | 1.6 | 3.5 |
| Needle penetration strength (g/$\sqrt{mm}$) | 295 | 566 | 249 | ≧1000 | 317 |
| Contact angle (°) | 28.5 | 26.5 | 19.0 | 30.5 | 23.0 |
| Visible ray percent tranmission (%) | >90 | >90 | >90 | >90 | >90 |

| Ex. No. | 11 | 12 | 13 | 14 | 15 |
|---|---|---|---|---|---|
| Components (part) | | | | | |
| Hydrophilic siloxanylalkyl ester | Si3(50) | Si3(50) | Si3(50) | Si4(30) | Si4(70) |
| Hydrophobic monomer | | | | | |
| Dodecyl methacrylate | — | — | — | 40 | 10 |
| Methyl methacrylate | — | — | 30 | — | — |
| Butyl methacrylate | 20 | 20 | — | — | — |
| Hydrophilic monomer | | | | | |
| NVP | 5 | — | 10 | 15 | 10 |
| 2HEMA | 25 | 25 | 10 | 15 | 10 |
| Dimethylacrylamide | — | 5 | — | — | — |
| Cross-linking monomer | | | | | |
| Allyl methacrylate | 0.5 | 0.5 | 0.5 | 0.5 | 0.5 |
| 2,2′-Azobis-(2,4-dimethylvaleronitrile) | 0.05 | 0.05 | 0.05 | 0.1 | 0.1 |
| Physical properties | | | | | |
| Water content (%) | 10.8 | 8.8 | 13.0 | 21.3 | 13.1 |
| Oxygen permeability ($\times 10^{-10}$ cc · cm/cm$^2$ · sec · mmHg) | 4.6 | 2.8 | 2.1 | 3.8 | 4.3 |
| Needle penetration strength (g/$\sqrt{mm}$) | 504 | 297 | ≧1000 | 700 | 220 |
| Contact angle (°) | 19.0 | 18.5 | 26.0 | 20.5 | 24.0 |

TABLE 1-continued

| Visible ray percent transmission (%) | >90 | >90 | >90 | >90 | >90 |
|---|---|---|---|---|---|
| Ex. No. | 16 | 17 | 18 | 19 | 20 |
| Components (part) | | | | | |
| Hydrophilic siloxanylalkyl ester | Si5(30) | Si5(50) | Si5(70) | Si6(30) | Si6(50) |
| Hydrophobic monomer | | | | | |
| Dodecyl methacrylate | 40 | 30 | 10 | 40 | 30 |
| Methyl methacrylate | — | — | — | — | — |
| Butyl methacrylate | — | — | — | — | — |
| Hydrophilic monomer | | | | | |
| NVP | 15 | 10 | 10 | 15 | 10 |
| 2HEMA | 15 | 10 | 10 | 15 | 10 |
| Dimethylacrylamide | — | — | — | — | — |
| Cross-linking monomer | | | | | |
| Allyl methacrylate | 0.5 | 0.5 | 0.5 | 0.5 | 0.5 |
| 2,2'-Azobis-(2,4-dimethylvaleronitrile) | 0.1 | 0.1 | 0.1 | 0.1 | 0.1 |
| Physical properties | | | | | |
| Water content (%) | 15.8 | 9.0 | 9.3 | 14.3 | 8.2 |
| Oxygen permeability ($\times 10^{-10}$ cc · cm/cm$^2$ · sec · mmHg) | 3.2 | 4.4 | 5.2 | 3.4 | 4.3 |
| Needle penetration strength (g/$\sqrt{mm}$) | 686 | 499 | 307 | 827 | 416 |
| Contact angle (°) | 28.0 | 32.0 | 35.5 | 19.0 | 27.0 |
| Visible ray percent transmission (%) | >90 | >90 | >90 | >90 | >90 |
| Ex. No. | 21 | 22 | 23 | 24 | 25 |
| Components (part) | | | | | |
| Hydrophilic siloxanylalkyl ester | Si6(70) | Si7(30) | Si7(50) | Si8(30) | Si9(30) |
| Hydrophobic monomer | | | | | |
| Dodecyl methacrylate | 10 | 40 | 30 | 40 | 40 |
| Methyl methacrylate | — | — | — | — | — |
| Butyl methacrylate | — | — | — | — | — |
| Hydrophilic monomer | | | | | |
| NVP | 10 | 15 | 10 | 15 | 15 |
| 2HEMA | 10 | 15 | 10 | 15 | 15 |
| Dimethylacrylamide | — | — | — | — | — |
| Cross-linking monomer | | | | | |
| Allyl methacrylate | 0.5 | 0.5 | 0.5 | 0.5 | 0.5 |
| 2,2'-Azobis-(2,4-dimethylvaleronitrile) | 0.1 | 0.1 | 0.1 | 0.1 | 0.1 |
| Physical properties | | | | | |
| Water content (%) | 9.1 | 20.0 | 9.8 | 25.0 | 13.0 |
| Oxygen permeability ($\times 10^{-10}$ cc · cm/cm$^2$ · sec · mmHg) | 4.1 | 4.9 | 4.2 | 3.6 | 2.6 |
| Needle penetration strength (g/$\sqrt{mm}$) | 347 | 512 | 215 | 562 | 762 |
| Contact angle (°) | 27.5 | 22.0 | 20.0 | 19.0 | 21.0 |
| Visible ray percent transmission (%) | >90 | >90 | >90 | >90 | >90 |
| Ex. No. | 26 | 27 | 28 | 29 | 30 |
| Components (part) | | | | | |
| Hydrophilic siloxanylalkyl ester | Si9(50) | Si9(70) | Si3(50) | Si3(50) | Si3(50) |
| Hydrophobic monomer | | | | | |
| Dodecyl methacrylate | 30 | 30 | — | — | — |
| Methyl methacrylate | — | — | — | — | — |
| Butyl methacrylate | — | — | 30 | — | 2-ethylhexyl methacrylate |
| Hydrophilic monomer | | | | | |
| NVP | 10 | 10 | 10 | 10 | 10 |
| 2HEMA | 10 | 10 | 10 | 10 | 10 |
| Dimethylacrylamide | — | — | — | — | — |
| Cross-linking monomer | | | | | |
| Allyl methacrylate | 0.5 | 0.5 | 2.0 | ethylene glycol dimethacrylate 1.0 | 0.5 |
| 2,2'-Azobis-(2,4-Dimethylvaleronitrile) | 0.1 | 0.1 | 0.05 | 1.0 | 0.05 |
| Physical properties | | | | | |
| Water content (%) | 8.5 | 10.0 | 7.1 | 8.1 | 9.3 |
| Oxygen permeability ($\times 10^{-10}$ cc · cm/cm$^2$ · sec · mmHg) | 3.0 | 2.2 | 3.0 | 3.0 | 3.7 |
| Needle penetration strength (g/$\sqrt{mm}$) | 502 | 408 | 565 | 515 | 330 |
| Contact angle (°) | 28.5 | 28.0 | 21.5 | 20.0 | 20.0 |

TABLE 1-continued

| Visible ray percent transmission (%) | >90 | >90 | >90 | >90 | >90 |
|---|---|---|---|---|---|

What we claim is:

1. A copolymer suitable for use in the production of an oxygen permeable soft contact lens, comprising a copolymer of the following monomers:

(a) a hydrophilic siloxanylalkyl ester having the formula (I):

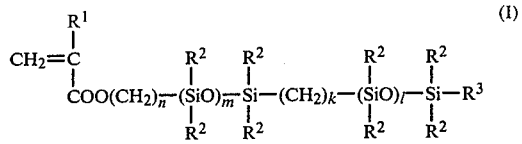
(I)

wherein $R^1$ is hydrogen atom or methyl group, $R^2$ is methyl group or $-OSi(CH_3)_3$, $R^3$ is a hydrophilic group selected from the group consisting of an oligo ether residue, a diol residue, an aminohydrin residue and an acid amido residue, n is an integer of 1 to 4, m and l are 0 or an integer of 1 to 2, and k is an integer of 2 to 4, or an admixture thereof, (b) a hydrophilic monomer other than said monomer (a), and (c) a hydrophobic monomer.

2. The copolymer suitable for use in the production of an oxygen permeable soft contact lens of claim 1, wherein the substituent group defined as $R^3$ in the formula (I) is a hydrophilic group selected from the group consisting of an oligo ether residue having the formula:

$$-(CH_2)_3O(CH_2CH_2O)_x-R^4$$

wherein x is 0 or an integer of 1 to 5 and $R^4$ is hydrogen atom or an alkyl group having 1 to 4 carbon atoms; a diol residue having the formula:

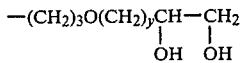

wherein y is an integer of 1 to 3; an aminohydrin residue having the formula:

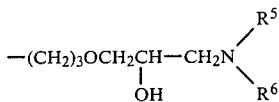

wherein $R^5$ and $R^6$ are the same or different, and each is hydrogen atom or an alkyl group having 1 to 4 carbon atoms; an aminohydrin residue having the formula:

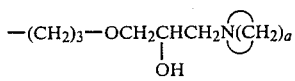

wherein a is an integer of 4 to 7; an acid amido residue having the formula:

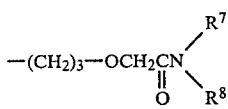

wherein $R^7$ and $R^8$ are the same or different and each is hydrogen atom or an alkyl group having 1 to 4 carbon atoms; and an acid amido residue having the formula:

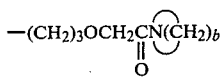

wherein b is an integer of 4 to 7.

* * * * *